United States Patent [19]

Wittnebel et al.

[11] Patent Number: 4,873,135

[45] Date of Patent: Oct. 10, 1989

[54] PREFRAMED TRANSPARENCY FILM HAVING IMPROVED FEEDING RELIABILITY

[75] Inventors: Bruce W. Wittnebel, White Bear Lake; Kerry D. Reimer, Hugo; Leonard F. Miller, Lakeland, all of Minn.

[73] Assignee: Minnesota Mining and Manufacturing Company, St. Paul, Minn.

[21] Appl. No.: 149,856

[22] Filed: Jan. 29, 1988

[51] Int. Cl.$^4$ .................... B32B 23/02; G03G 15/04
[52] U.S. Cl. .................... 428/192; 428/141; 428/142; 428/157; 428/195; 428/200; 428/327; 428/412; 428/413; 428/451; 428/473.5; 428/474.4; 428/480; 428/483; 428/522; 428/523; 428/913; 428/66; 40/158.1
[58] Field of Search ............ 40/158 B; 428/192, 261, 428/195, 478.2, 480, 343, 352, 355, 356, 200, 201, 202, 327, 483, 194, 141, 220, 157, 354, 45–47, 329, 412, 413, 448, 451, 458, 461, 469, 522–523, 463, 473.5, 474.4, 913; 430/98, 99, 67, 124, 126, 66

[56] References Cited

U.S. PATENT DOCUMENTS

| | | | |
|---|---|---|---|
| 3,618,752 | 5/1969 | Barker | 206/57 |
| 3,854,942 | 1/1973 | Akman | 96/1.2 |
| 3,892,900 | 7/1975 | Shima et al. | 428/40 |
| 4,262,053 | 4/1981 | Burnasser | 428/327 |
| 4,320,186 | 3/1982 | Kato | 430/98 |
| 4,429,039 | 1/1984 | Ochiai | 428/483 |
| 4,480,003 | 10/1984 | Edwards et al. | 428/329 |
| 4,530,898 | 7/1985 | Spiegal | 430/403 |
| 4,542,093 | 9/1985 | Suzuki et al. | 430/523 |
| 4,575,465 | 3/1986 | Viola | 428/195 |
| 4,637,974 | 1/1987 | Kubit | 430/126 |
| 4,686,549 | 8/1987 | Williams et al. | 428/212 |
| 4,719,169 | 1/1988 | Platzer et al. | 430/143 |
| 4,737,410 | 4/1988 | Kantner | 428/355 |

Primary Examiner—Ellis P. Robinson
Assistant Examiner—Donald J. Loney
Attorney, Agent, or Firm—Donald M. Sell; Walter N. Kirn; David L. Weinstein

[57] ABSTRACT

Sheet material suitable for preparing visual transparencies comprising:
(a) a backing that is transparent to visible light,
(b) an image receptive layer transparent to visible light adhered to at least one major surface of said backing, and
(c) an anti-blocking layer transparent to visible light adhered to at least one major surface of said backing.

The sheet material has an opague border extending around the periphery thereof. The sheet material also has an area of increased caliper along one edge thereof; this area extends inward from the edge for a distance not exceeding the width of the opague border along the edge. The border provides the sheet material with a frame, while the area of increased caliper provides improved feeding reliability for xerographic imaging apparatus.

9 Claims, 2 Drawing Sheets

PREFRAMED TRANSPARENCY FILM HAVING IMPROVED FEEDING RELIABILITY

BACKGROUND OF THE INVENTION

1. Field of the Invention

This invention relates to xerographic imaging, and, more particularly, to transparencies that are imageable by means of a xerographic process.

2. Discussion of the Prior Art

As is well known, xerographic imaging commonly involves imparting a uniform electrostatic charge, either positive or negative, depending on the specific machine under consideration, to a photoconducting surface which will hold a charge only in the dark, such as a selenium coated drum. This may be accomplished by passing the drum under a series of corona-discharge wires in the dark. The photoconducting surface is then exposed through a lens system to a document or article bearing the image which is to be formed. In areas where light strikes the photoconducting surface the charge is dissipated and flows off through a conducting support to ground, with electrostatic charge remaining largely intact in the image areas. Next, oppositely charged particles, called "toner", comprising a colored thermoplastic resin is brought into contact with the photoconducting surface, where it clings by electrostatic attraction to the charged areas of the surface, forming a visible image called a "powder image". A sheet which is to receive the image is placed over the powder image, and is given a charge, such as by use of corona-discharge wires. As a result, a large portion of the charged powder on the photoconducting surface is transferred to the sheet. Finally, the toner is fused to the sheet by application of heat, pressure, or a combination of both. At present, xerographic copies which use plain paper for reproduction of images from a master generally employ a dry powder ("toner") to form the image.

The toner powder is generally comprised of a polymeric resin, dyes or pigments, and various additives to control the surface charge and other characteristics necessary for reliable operation. The most common method of fusing the toner to the copy sheet is to heat it, either with lamps or heated rolls. Heated rolls combine heat and pressure, thus reducing the amount of heat needed. Cold pressure fusing, which uses no heat and very high pressure, may also be used.

The principles of image formation by the application of toner to a medium in a xerographic imaging machine do not depend upon whether that medium is film or paper. In practice, however, it has been found that xerographic imaging onto film presents difficulties that imaging onto paper does not.

First, film is smoother and less electrically conductive than paper. As a result, film sheets have a much greater tendency to cling to like sheets than do paper sheets. When large numbers of sheets of film are stacked, they tend to cling to one another, forming a solid block. This phenomenon, called "blocking", prevents many types of film from being reliably fed from conventional paper trays using the automatic feeding mechanisms of the type found in most xerographic imaging machines There are several ways of modifying film in order to reduce blocking. One such method involves roughening the surface, so as to reduce the intimacy of contact between adjacent sheets. This can be done either by adding particulate matter to the film itself, or by adding the particulate matter as a coating, using a polymeric material as a binder to hold the particulate matter in place. However, surface roughening has a disadvantage in that roughened surfaces tend to scatter transmitted light, thus reducing the image contrast when such films are viewed in the transmission mode, as in overhead projection.

Another method for reducing blocking and thereby improving film feeding is the addition of antistatic materials, such as quaternary ammonium salts, to a coating of the film. This serves to reduce electrostatic cling under certain circumstances, and may also reduce the coefficient of friction between the film surface and the surface of other film sheets.

Another method for reducing electrostatic cling is to attach a sheet of paper of the about the same size as the film sheet to the film sheet itself, typically by applying a strip of adhesive along one edge of the film sheet, and then attaching the paper sheet to the film sheet. Although effective in reducing blocking, the attached paper sheet must be removed before the imaged film sheet can be shown by an overhead projector. An imageable film sheet that has been constructed in this manner is disclosed in U.S. Pat. No. 3,618,752.

A second problem that has been encountered in substituting film sheets for paper sheets in xerographic imaging machines is that some machines of this type employ an optical sensor to determine the presence of paper sheets. Because these sensors depend upon the opacity of paper to be effective, they often cannot operate effectively when a transparent film sheet is used. In order to overcome this problem, it has become standard practice to print an opaque strip along one edge of each sheet of film. However, these strips are unacceptable to some users because the projected image area is reduced from 8½×11 inches down to as low as about 7⅞×11 inches.

Another method of modifying film sheets to operate effectively in machines having optical sensors is the application thereto of a removable opaque stripe in place of the printed opaque stripe described previously. This sheet is typically a strip of paper or tape, applied at or near one edge of the sheet of film, by means of an adhesive which allows removal of the strip without damage to the film and without leaving a visible adhesive residue on the film. Unlike the coextensive sheet described previously, the strip can be left on the film during viewing, but it can be removed in cases where this proves objectionable. Further, paper or tape strips have greater opacity than do printed strips, thereby improving the reliability with which the optical sensor responds to the sheet.

The use of a single strip along one edge of the film sheet for the purpose of activating optical sensors has the disadvantage that the operator must load the film sheets into the paper tray in such a way that the edge bearing the strip enters the machine with the proper orientation, because the strip-bearing edge must pass a particular location to activate the optical sensor. A method for eliminating this disadvantage has been disclosed in U.S. Pat. No. 4,637,974, wherein a strip is applied along each of the four edges of the sheet, so that no matter which way the sheets are placed in the machine, there will always be an opaque area on the edge required by the optical sensor. This film sheet has the disadvantage that the edge strips intrude into the transparent area not just along one edge, but along all four edges, thereby reducing the viewable area to a greater degree.

Another aspect wherein xerographic imaging onto film differs from xerographic imaging onto paper is in the method by which the image is viewed. The most common reason for using film rather than paper as the imaging medium is to enable the image to be viewed by light transmitted through the image bearing medium, as in overhead projection. A problem which commonly arises in showing images carried on standard size sheets of film by overhead projection is that the stage aperture of the projector is typically larger than the sheet of film. As a result, the image of the aperture appearing on the screen will be larger than the image of the sheet of film. Those areas of the projector stage not covered by film will therefore appear as very bright areas on the screen. These bright areas tend to make the image look dark and of poor contrast, and are therefore objectionable to many viewers.

A common method of eliminating such bright areas is to attach the sheet of film to a cardboard frame having outside dimensions of sufficient size to cover the projector stage, and inside dimensions which result in a pleasing screen appearance. Such frames are commercially available. They have the disadvantages of being bulky, being difficult to transport and store, and requiring considerable labor in attaching the imaged sheets to them.

The work of attaching the imaged sheets of film to frames can be eliminated by the use of preframed transparencies, which are also commercially available. Preframed transparency films are constructed by applying opaque borders to sheets of film which are of sufficiently large size to cover an overhead projector stage. It has been found, however, that such large sheets of film are difficult to feed reliably from many of the paper supply trays found in conventional xerographic imaging machines.

Transparent film sheets having removable strips suffer from disadvantages which tend to outweigh their advantages. The high feeding reliability is offset by the limitation of having to accept either reduced format or the added work of removing the strip. If a framed image is desired, additional work is required to apply such frames. Preframed transparency films exhibit great difficulty in feeding.

SUMMARY OF THE INVENTION

This invention provides a sheet material suitable for preparing visual transparencies by means of xerographic process comprising:
(a) a backing that is transparent to visible light,
(b) an image receptive layer transparent to visible light adhered to at least one major surface of said backing, and
(c) an anti-blocking layer transparent to visible light adhered to at least one major surface of said backing,
said sheet material having an opaque border extending around the periphery thereof, said sheet material further having an area of increased caliper along one edge thereof, said area extending inward from said edge for a distance not exceeding the width of said opaque border along said edge. This area of increased caliper is referred to herein as the leading edge strip.

The present invention combines into one product the feeding reliability of removable stripe transparency films and the pleasing appearance and ease of preparation of preframed transparencies, while eliminating the disadvantages of both types of transparencies.

DETAILED DESCRIPTION

Figure 1:
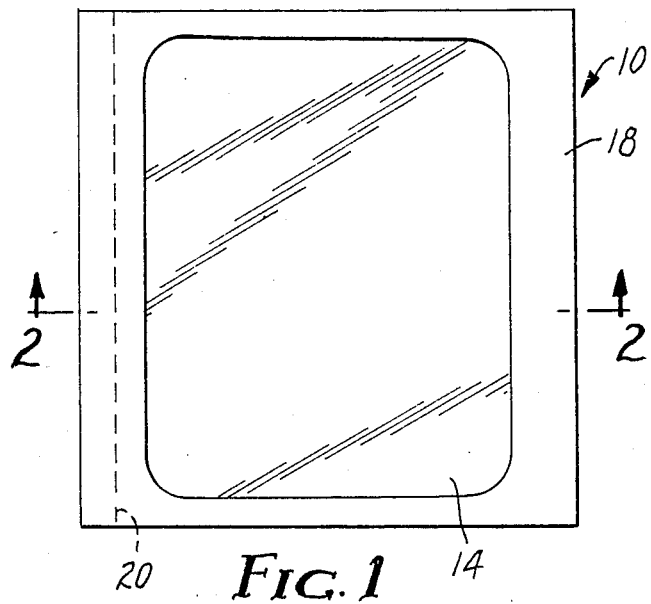
FIG. 1 is a plan view of a transparent film sheet according to the present invention, showing the configuration of the opaque border and leading edge strip.
Figure 2:
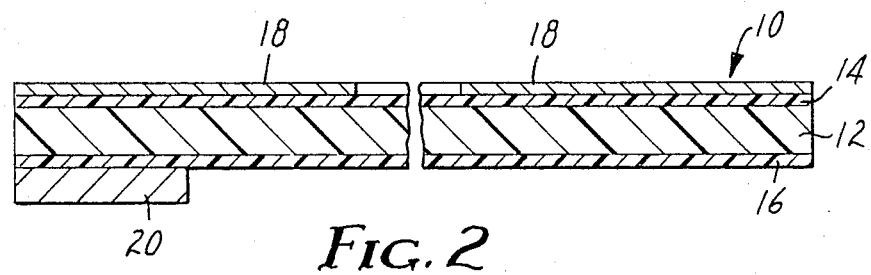
FIG. 2 is a cross-sectional view, taken along line 2—2 of FIG. 1, of a transparent film sheet according to the present invention, showing the opaque border and leading edge strip, with the opaque border applied to the opposite side of the sheet as the leading edge strip.
Figure 3:
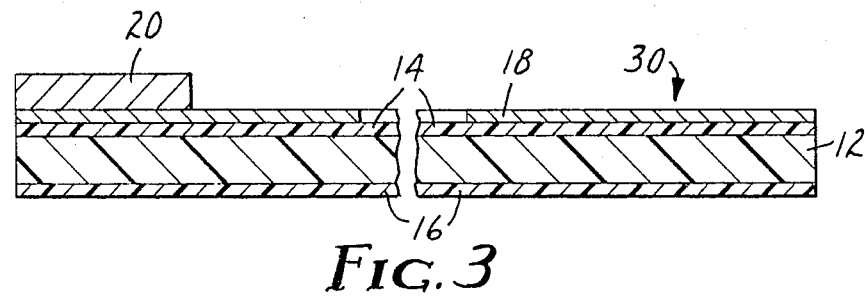
FIG. 3 is a cross-sectional view, taken along line 2—2 of FIG. 1, of a transparent film sheet according to the present invention, showing the opaque border and leading edge strip, with the opaque border applied to the same side of the sheet as the leading edge strip.

Referring to FIGS. 1, 2, and 3, the transparent film sheets 10 and 30 of the present invention comprise a transparent, polymeric film base 12 bearing an image receptive layer 14 on at least one major surface thereof and an anti-blocking layer 16 on the other major surface thereof. An opaque border 18 can be applied to anti-blocking layer 16 (FIG. 2) or to image receptive layer 14 (FIG. 3). Although not shown on the embodiments in FIG. 2 or FIG. 3, opaque border 18 can be applied directly to film base 12 or to a prime coat that has been applied to film base 12. Leading edge strip 20 can be applied to image receptive layer 14 or anti-blocking layer 16. As used herein, the term "leading edge" means the edge of film sheet 10 that first enters the xerographic imaging apparatus. Because it is possible for a single layer to exhibit both image-receptive and anti-blocking properties, it is often convenient to make anti-blocking layer 16 similar to or identical with image-receptive layer 14. As shown in the alternative constructions of FIGS. 2 and 3, opaque border 18 may be either on the image receptive side of film base 12 (FIG. 2) or on the side of film base 12 opposite the image receptive side of film base 12(FIG. 3). Optionally, a priming coat (not shown) can be interposed between image receptive layer 14 and film base 12 or between anti-blocking layer 16 and film base 12, for the purpose of improving adhesion of these layers to film base 12.

Materials suitable for film base 12 must be transparent and sufficiently flexible to be used in conventional xerographic imaging machines. It is preferred that the film base material be resistant to shrinkage at elevated temperatures. The elevated temperatures encountered in xerographic imaging machine fusers can cause significant shrinkage of polymeric films. That shrinkage, which usually occurs in a nonuniform manner, results in curling and crinkling, consequently preventing such films from laying flat on the stage of overhead projectors. Non-flatness can reduce the quality of the projected image, on account of localized areas of the image being outside the focal plane of the projector. Although some correction of the non-flat condition may be achieved by firmly affixing the imaged sheet to a more rigid frame, such as the commercially available cardboard transparency frames commonly used for this purpose, it is a primary purpose of this invention to avoid adding additional framing materials. It has been found that film base materials that shrink less than about 0.9% in any direction when held unrestrained in air at 150° C. for 30 minutes and that are otherwise unharmed by such exposure are satisfactory for use in the present invention. Materials suitable for the present invention include, but are not limited to, polysulfone, polycarbonate, polyimide, and polyester, such as, for example, polyethylene terephthalate. A preferred polymeric material is biaxially oriented and heat-set polyethylene terephthalate, such as for example "Scotchpar", available from the Minnesota Mining and Manufacturing Company.

It is preferred that layers 14 and 16 adhere to film base 12 with sufficient tenacity to allow transparent film sheet 10 to be handled in the manner in which overhead transparencies are customarily handled, without detachment of layers 14 and 16 from film base 12. Adhesion can be enhanced by prime coatings or by surface treatments applied to the major surfaces of film base 12 prior to application of layers 14 and 16. A material that has been found satisfactory as a prime coating is polyvinylidene chloride. Surface treatments for film base 12 that have been found satisfactory include corona treatment and surface etching, both of which are well known in the art.

Image receptive layer 14 comprises a polymeric binder material, which preferably contains a dispersed particulate material therein, and, optionally, lubricants and antistatic additives. The polymeric binder material can comprise a homopolymer, copolymer, such as, for example, terpolymer, a blend of one or more polymers or copolymers, or other like composition. Polymeric binder materials that have been found satisfactory for use in image receptive layer 14 include, but are not limited to, polymethyl methacrylate, polyvinyl acetate, copolymers of polyvinyl acetate and polyvinyl chloride, and blends thereof. In addition to the primary polymeric binder material, adhesion-promoting polymers such as chlorinated polyolefins and polyesters can also be added to the formulation of image receptive layer 14 for the purpose of aiding adhesion of layer 14 to film base 12.

Particulate materials suitable for layer 14 include amorphous fumed silica, preferably having average particle sizes ranging from about 2 to about 15 microns, and urea formaldehyde, preferably in the form of small particles agglomerated into larger particles having an average diameter of about 7–8 microns. If used, the particulate material should be added to the coating formulation in amounts sufficient to roughen the surface but not in such great amounts that excessive light scattering would result, which manifests itself as haze.

While the anti-blocking properties of film sheets can be enhanced by adding sufficient particulate material to yield a surface roughness comparable to that of paper (which has a typical Sheffield number on the order of 100 or more), such quantities of particulate material generally also produce excessively high haze levels. It has been found that a somewhat smoother film surface (e.g. Sheffield number in the range of 10 to 30) can yield acceptable anti-blocking behavior while still keeping the haze value below about 15%, which is considered acceptable for image receptive layer 14 of the present invention. Surface roughness can be measured by means of a Sheffield Smoothcheck instrument, available from Bendix Corp., using the test procedure set forth in TAPPI Useful Method 518 (1986). Haze can be measured by the procedure set forth in ASTM D 1003-61 (Reapproved 1977).

Lubricants and antistatic agents suitable for image receptive layer 14 include quaternary ammonium salts, such as "Cyastat SN" and "Cyanstat 609", available from American Cyanamid Company. These materials are preferably added to the coating formulation in amounts sufficient to impart a measurable level of electrical conductivity to the surface, as well as provide lubrication sufficient to bring the coefficient of friction of the surface into the range of about 0.2 to about 0.4, measured between the surface of image receptive layer 14 and the surface of anti-blocking layer 16. Coating formulations that utilize the ingredients described herein and that are suitable for use in image receptive layer 14 are disclosed in U.S. Pat. No. 3,854,942, U.S. Pat. No. 4,320,186, and in U.S. Pat. No. 4,480,003, all of which are incorporated herein by reference.

Anti-blocking layer 16 is capable of providing a transparent, anti-blocking surface, so that when sheets of film of this invention are stacked, clinging or adhesion of the surface of anti-blocking layer 16 of a given sheet to the surface of image receptive layer 14 of the adjacent sheet in the stack is prevented. Stacking of sheets in this manner commonly occurs in the paper supply tray of a xerographic imaging machine. Since many formulations of image receptive layer 14 can exhibit anti-blocking properties in addition to their image receptive properties, it is often convenient to use an identical formulation for layers 14 and 16. An example of where this is not possible, on the other hand, is the case where film sheet 10 is to be used in a xerographic imaging machine that cannot tolerate the level of electrical conductivity in image receptive layer 14 that antistatic agents would impart. In such a case, antistatic agents might be used in anti-blocking layer 16 only, with image receptive layer 14 comprising binder, preferably particulate material, and perhaps lubricant, but without any conductivity-increasing additives.

Layers 14 and 16 can be applied by coating of solutions, latex dispersions, or other similar liquid compositions, with any solid particulate materials used being uniformly dispersed therein Coating can be conducted by conventional means, such as reverse roll, rotogravure, air knife, or other means of the type conventionally used in coating of flexible substrates such as film and paper. Weights of the dried coatings can be in the range of about 10 to about 1000 mg per square foot, with the preferred range being about 100 to about 200 mg per square foot.

Opaque border 18 comprises a pigment dispersed in a suitable binder, typically applied as a liquid composition, such as, for example, a solution or latex dispersion having a pigment dispersed therein. The liquid composition may additionally contain adhesion promoters, wetting agents, and the like, for the purpose of improving coatability, adhesion, and other desirable properties. A preferred color for opaque border 18 is white, which color can be obtained by use of titanium dioxide pigment Coatable liquid compositions suitable for forming opaque border 18 are commercially available in the form of inks. The ink may be applied using any conventional printing means, such as rotogravure printing or flexography. Pigment loading and print density is preferably sufficient to give opaque border 18 an opacity of 50% or greater, as measured according to TAPPI Useful Method 411, section 3.0 (corrected November, 1978).

Outside dimensions of film sheet 10 can vary, as can dimensions of opaque border 18. Representative examples of outside dimensions of film sheet 10 and dimensions of the transparent area surrounded by opaque border 18 are as follows:

| Outside dimensions |
| --- |
| 10 in. × 10 in. |
| 10½ in. × 10½ in. |
| 11 in. × 11 in. |
| 11¼ in. × 11¼ in. |

| Transparent area dimensions |
| --- |
| 7¾ in. × 9½ in. |
| 8 in. × 9¾ in. |
| 8½ in. × 9½ in. |

Leading edge strip 20 can be in the form of a solid ribbon of flexible material, e.g. tape, or in the form of a printed coating. Materials suitable for the solid ribbon embodiment preferably have one major surface which exhibits non-sticking, anti-blocking, anti-clinging properties, with the second major surface exhibiting properties which promote adhesive bonding of strip 20 to image receptive layer 14 or anti-blocking layer 16. It has been found that materials having properties similar to bond paper are suitable for use as leading edge strip 20. Preferably, materials suitable for leading edge strip 20 exhibit a surface electrical resistivity, measured according to ASTM D257-78 (Reapproved 1983), in a range similar to that of bond paper, i.e., preferably below about $10^{12}$ ohms per square. Similarly, materials suitable for strip 20 exhibit a Sheffield smoothness comparable to that of bond paper, as measured according to TAPPI Useful Method 518. Sheffield smoothness for strip 20 is preferably above about 90 Sheffield units.

Adhesion of strip 20 to image receptive layer 14 or anti-blocking layer 16 may be by any means which allows sufficient flexibility, sheet flatness, and durability for film sheet 10 to be used for its intended purpose. It is preferred that no adhesive be allowed to escape beyond the area occupied by leading edge strip 20, as such residual adhesive might cause unwanted sticking between adjacent sheets 10 or between sheet 10 and other contacting surfaces, either before, during, or after imaging. It has been found that many pressure-sensitive adhesive materials exhibit these features while providing the additional advantage of ease of application. A material having both the desired surface properties and the desired adhesion properties as described herein for a film base 12 made of polyester is Type 658 Cover-Up Tape, available from Minnesota Mining and Manufacturing Company.

Leading edge strip 20 can alternatively be applied by coating a liquid composition, provided that a suitable layer thickness, coefficient of friction, surface roughness, electrical conductivity and adhesion can be achieved. Coating formulations that exhibit these features generally utilize high concentrations of particulate materials of relatively large particle sizes. Coating can be carried out by any conventional means that allows the application of a well defined strip having sufficient coating thickness and the required surface characteristics.

The width of leading edge strip 20 is equal to or less than the width of the opaque border upon which it is applied. The width of leading edge strip 20 preferably ranges from about ¼ in. to about ¾ in. The caliper of leading edge strip 20 preferably ranges from about 0.002 in. to about 0.005 in., more preferably from about 0.003 in. to about 0.004 in. Regardless of the particular caliper of leading edge strip 20, it is preferred that strip 20 be of sufficient thickness so as to provide an air gap between the leading edges of adjacent sheet material when said sheet material is disposed in a stack.

In order to more fully illustrate the present invention and the advantages thereof, the following non-limiting, illustrative example is provided.

EXAMPLE 1

A coatable liquid composition suitable for preparing both image receptive layer 14 and anti-blocking layer 16 was prepared by adding the ingredients shown in Table I, in the proportions shown therein, to a mixture of 433 parts by weight of toluene and 396 parts by weight of methyl-ethyl ketone.

TABLE I

| Ingredient | Parts by weight |
| --- | --- |
| Polymethyl methacrylate ("Elvacite 2041", E. I. DuPont, de Nemours & Co.) | 127.5 |
| Soluble polyester resin ("Vitel PE-200", Goodyear Tire and Rubber Company) | 2.5 |
| Urea-formaldehyde particulate ("Pergopak M-2", Ciba-Geigy Corp.) | 1.8 |
| Quaternary ammonium salt ("Cyastat SN", American Cyanamid Company) | 0.98 |
| Quaternary ammonium salt ("Cyastat 609", American Cyanamid Company) | 0.98 |

The polymethyl methacrylate and polyester resin were added to the solvent mixture slowly, at room temperature (about 20° C.), with agitation. Agitation was continued until a clear solution was obtained, after which the remaining ingredients shown in Table I were added. This dispersion was then homogenized by being passed through a homogenizer orifice at a pressure of at least 4000 pounds per square inch. After homogenization, an additional 37.2 parts by weight of methyl-ethyl ketone were through the homogenizer and added to the solution, in order to rinse any residual ingredients retained in the homogenizer into the solution, thereby achieving the desired final concentration.

The homogenized composition was then coated by means of a rotogravure printing press onto both major surfaces of a continuous web of unprimed polyethylene terephthalate film base ("Scotchpar") having a caliper of 0.004 in., thereby forming the image receptive layer and the anti-blocking layer. Coating weight after drying was approximately 200 milligrams per square foot on each major surface of the film base. The thus-formed web is designated by the reference numeral 40.

Figure 4:
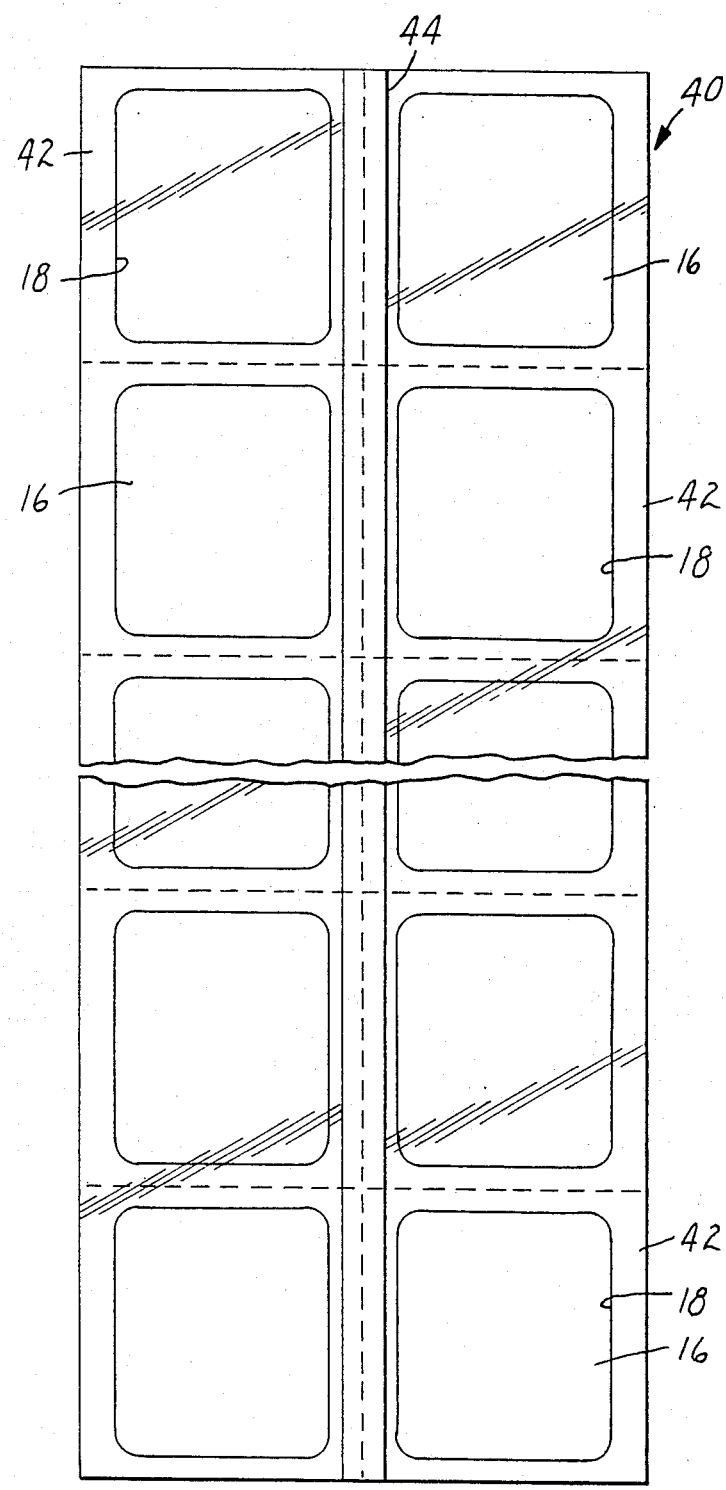
FIG. 4 is a plan view of the continuous web of film after printing the opaque border pattern and application of the leading edge strip, but before converting into sheet form.

Opaque borders 18 were applied to web 40 by means of a rotogravure printing press, the borders being applied as a series of adjacent frames 42, as shown in FIG. 4. Each frame 42 was a precursor for a sheet of transparent film. One frame was disposed on each side of the middle of web 40. The ink for preparing the borders 18 comprised titanium dioxide pigment dispersed in a polymeric binder and is commercially available as "Rotowhite Ink FA15526-A" from Consolidated Printing Ink, St. Paul, MN. The ink was applied in the border areas at a dry coating weight of about 540 mg per sq. ft. This weight provided an opacity of 61%, as measured by a Photovolt Model 575 Reflection and Glossmeter, available from Seragen, Inc. The test procedure for the opacity measurement is given in Section II C-3.3 of the instructions accompanying this instrument.

Leading edge strips 20 were prepared from Type 658 Cover-Up Tape, available from the Minnesota Mining and Manufacturing Company, St Paul, Minnesota, having a width of 1⅛ in. The 1⅛ in. tape was applied by lamination of a strip of said tape 44 along the middle of web 40, as shown in FIG. 4. It is necessary to carefully control the web tension, tape tension, and laminating pressure so as to avoid internal mechanical stresses which could later result in curling of the final product.

Converting of continuous web 40 shown in FIG. 4 into individual sheets was accomplished by first slitting continuous web 40 along the center thereof, thereby also slitting leading edge strip tape 44 down its center, resulting in two substantially identical slit webs, each having a continuous leading edge strip laminated to it. Each of the slit webs was then cut into individual sheets, using automatic equipment capable of accurately locating the cutting line so as to achieve proper sizing and location of the frame in relation to the cut edges of said sheet. The cut sheets were packed, in groups of 100, in individual boxes in a manner that accurately portrayed conditions found in commercial production.

Testing of transparency sheets produced according to the present invention was performed by running 100 sheet lots of the sheets in xerographic imaging machines in a manner closely simulating the manner in which typical users of such machines would be expected to do. Evaluation of performance was accomplished by noting the incidence of more than one sheet feeding at a time (double and multiple feeding), the incidence of machine stoppage due to improper feeding (jamming), and any other difficulties arising from improper feeding. When this procedure was used to test the film produced according to the present example in a Minolta Model 450Z plain paper copier, no feeding failures of any kind occurred. Testing the film produced according to the present example in a 3M Model 6040 plain paper copier resulted in only three (3) jams in 100 sheets fed.

COMPARATIVE EXAMPLE A

As a comparative example, film sheets prepared according to Example 1, except that the tape strip was omitted, were also tested according to the above procedure. Feeding 100 sheets in the Minolta 450Z machine resulted in five (5) double feeds. In the 3M Model 6040, eight (8) double feeds and five (5) jams occurred.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A sheet material suitable for preparing visual transparencies comprising
    (a) a backing that is transparent to visible light,
    (b) an image receptive layer transparent to visible light adhered to at least one major surface of said backing,
    (c) an anti-blocking layer transparent to visible light adhered to at least one major surface of said backing, said sheet material having an opaque border extending around the periphery thereof, said sheet material further having an area of increased caliper along one edge thereof, said area extending inward from said edge for a distance not exceeding the width of said opaque border along said edge, said increased caliper being effected by a strip of thin material adhesively applied to one of said anti-blocking layer or said image receptive layer, said increased caliper being of sufficient thickness so as to provide an air gap between the leading edge of an adjacent like sheet material when said sheet materials are disposed in a stack.

2. The sheet material of claim 1 wherein said polymeric binder of said image receptive layer further comprises particulate material.

3. The sheet material of claim 1 wherein said polymeric binder of said image receptive layer further comprises an antistatic material.

4. The sheet material of claim 1 wherein said polymeric binder of said anti-blocking layer further comprises particulate material.

5. The sheet material of claim 1 wherein said polymeric binder of said anti-blocking layer further comprises an antistatic material.

6. The sheet material of claim 1 wherein said opaque border comprises a pigment dispersed in a binder.

7. The sheet material of claim 1 wherein said opaque border has an opacity of 50% or greater, as measured according to TAPPI Useful Method 411, section 3.0 (corrected November, 1978).

8. The sheet material of claim 1 wherein said strip of thin material is a pressure sensitive adhesive tape.

9. A sheet material suitable for preparing visual transparencies comprising
    (a) a backing that is transparent to visible light,
    (b) an image receptive layer transparent to visible light adhered to at least one major surface of said backing,
    (c) an anti-blocking layer transparent to visible light adhered to at least one major surface of said backing, said sheet material having an opaque border extending around the periphery thereof, said sheet material further having an area of increased caliper along one edge thereof, said area extending inward from said edge for a distance not exceeding the width of said opaque border along said edge, said increased caliper being effected by a printed coating, said increased caliper being of sufficient thickness so as to provide an air gap between the leading edge of an adjacent like sheet material when said sheet material are disposed in a stack.

* * * * *

UNITED STATES PATENT AND TRADEMARK OFFICE
CERTIFICATE OF CORRECTION

PATENT NO. : 4,873,135
DATED : OCTOBER 10, 1989
INVENTOR(S) : BRUCE W. WITTNEBEL ET AL.

It is certified that error appears in the above-identified patent and that said Letters Patent is hereby corrected as shown below:

Col. 6, line 59-60, after "pigment" insert a period.
Col. 9, line 20, "out" should read --cut--.
Col. 10, line 2, After "layer" insert --comprising a polymeric binder, said layer being--.
Col. 10, line 3, After "light" insert --and--.

Signed and Sealed this

Twenty-sixth Day of March, 1991

Attest:

HARRY F. MANBECK, JR.

*Attesting Officer*   *Commissioner of Patents and Trademarks*